US008016480B2

(12) United States Patent
Lozinski et al.

(10) Patent No.: US 8,016,480 B2
(45) Date of Patent: Sep. 13, 2011

(54) HEAT FLOW SENSOR

(76) Inventors: Alina Lozinski, Jerusalem (IL); Yuli Lozinski, Jerusalem (IL)

( * ) Notice: Subject to any disclaimer, the term of this patent is extended or adjusted under 35 U.S.C. 154(b) by 44 days.

(21) Appl. No.: 12/649,397

(22) Filed: Dec. 30, 2009

(65) Prior Publication Data

US 2010/0215074 A1   Aug. 26, 2010

(30) Foreign Application Priority Data

Feb. 23, 2009   (IL) .......................................... 197177

(51) Int. Cl.
*G01K 17/00* (2006.01)
*G01K 1/00* (2006.01)
*G01K 7/00* (2006.01)

(52) U.S. Cl. ......................................... 374/29; 374/135

(58) Field of Classification Search .................... 374/29, 374/135, 166
See application file for complete search history.

(56) References Cited

U.S. PATENT DOCUMENTS

| | | | | |
|---|---|---|---|---|
| 3,382,714 | A * | 5/1968 | Miller et al. | 374/29 |
| 7,232,255 | B2 * | 6/2007 | Lozinski | 374/29 |
| 2006/0256835 | A1 * | 11/2006 | Romes | 374/29 |
| 2010/0214124 | A1 * | 8/2010 | Lozinski et al. | 340/870.17 |

* cited by examiner

*Primary Examiner* — Lisa Caputo
*Assistant Examiner* — Mirellys Jagan
(74) *Attorney, Agent, or Firm* — AlphaPatent Associates Ltd.; Daniel J. Swirsky

(57) ABSTRACT

Heat flow sensor having at least two plates with the heat (thermo) sensitive elements and with holes (openings) for the passage of air flow, so that the tops of both plates with the thermo sensitive elements are placed facing the outer surface of the sensor, so that their openings coincide and the construction provides passage of air through the openings whereby the thermo sensitive elements are located between all the holes of the plates and serially connected on every plate, and then the said sensor (plates) has one common point of connection in the middle of each side so that each sensor has at least three output wires—the total, the output of each plate, and therefore the magnitude and direction of the heat flow, are determined by the difference between the outputs of the two earlier described plates.

6 Claims, 4 Drawing Sheets

HEAT FLOW SENSOR

CROSS-REFERENCE TO RELATED APPLICATIONS

This application claims priority benefit from Israel Patent Application No. 197177, filed Feb. 23, 2009, the contents of which are herein incorporated by reference in their entirety.

FIELD OF THE INVENTION

The present invention relates to a sensor for the measurement of heat flowing between an object and the ambient air that may be used in medicine, agriculture, building, and other fields.

BACKGROUND OF THE INVENTION

Heat flow sensors and measurements are widely used in medicine, building and agriculture, as described in U.S. Pats. Nos. 4,274,475; 5,524,618; 5,803,915; 6,533,731; 6,595,929 and 7,232,255 and in articles: Heat Flow Sensors, Bulletin 36614, Rdf Corporation. Hudson, N.H., USA; Degenne, M., Klarsfeld, S., in: Building Applications of Heat Flux Transducers, ASTM STP 885, Bales, E., Bomberg, M., Gourville, G. E. (eds.); Philadelfia: American Society for Testing and Materials, 1985, pp 163-171; Heat Flow Sensors by F. van der Graff, VCH Verlagsgesellschaft mbh, D-6940 Weinheim Federal Republic of Germany.

There are known constructions of heat flow sensors with openings for the passage of air using various thermo sensitive elements—resistance thermometer, thermocouple, thermistors, thermo diodes and etc.

Thermo sensitive elements are consequentially located in columns between series of openings, and thus are protected from damage by stickers or paint.

However since there is unused space between those openings, the sensitivity per unit area is a serious limitation in medical measurements.

SUMMARY OF THE INVENTION

The purpose of this invention is the development of a miniature heat flow sensor with high sensitivity per unit area.

The present invention utilizes thermo sensitive elements between all the openings of the sensor, thus enabling the utilization of thermo-sensitive elements, such as diodes with linear characteristics. As thermo diodes are used, their serial connection accounts for their polarity, which may make production slightly more difficult.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 illustrates old and new heat flow sensors with four openings.

FIG. 2 illustrates old and new heat flow sensors with nine openings.

FIG. 3 illustrates old and new heat flow sensors with six openings.

Figure 4A:
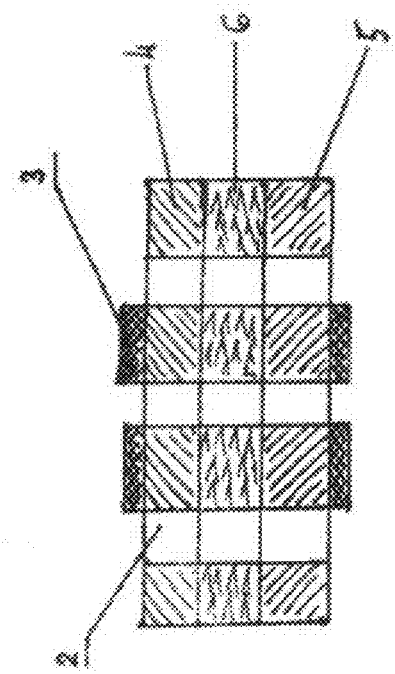
Figure 4B:
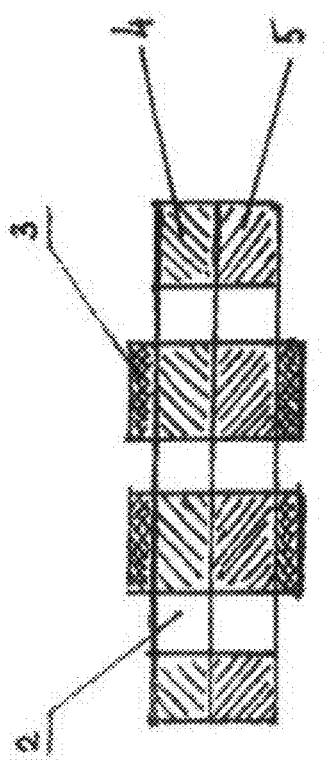
Figure 4C:
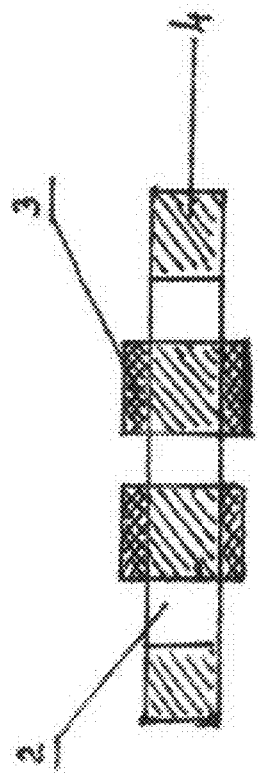

FIGS. 4A, 4B, and 4C illustrate construction of new heat flow sensors with one, two and three plates respectively.

DETAILED DESCRIPTION OF THE INVENTION

Figure 1:
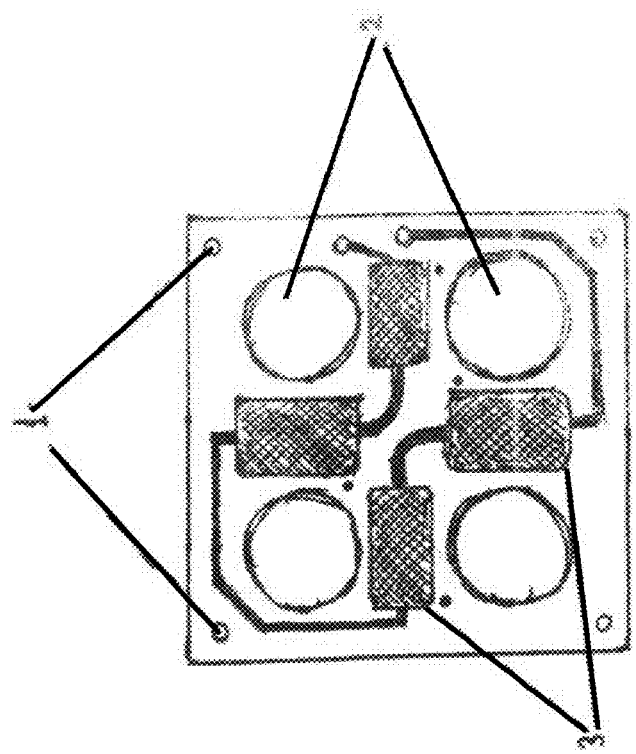
Figure 1:
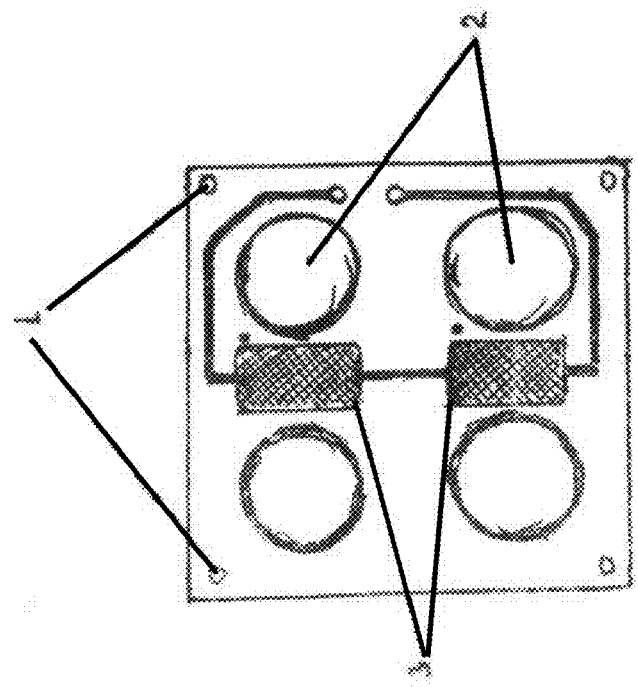
Figure 2:
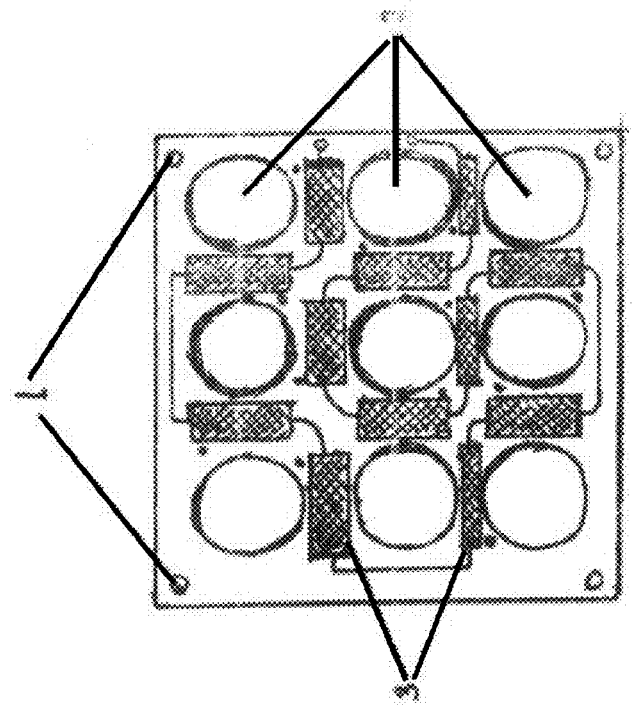
Figure 2:
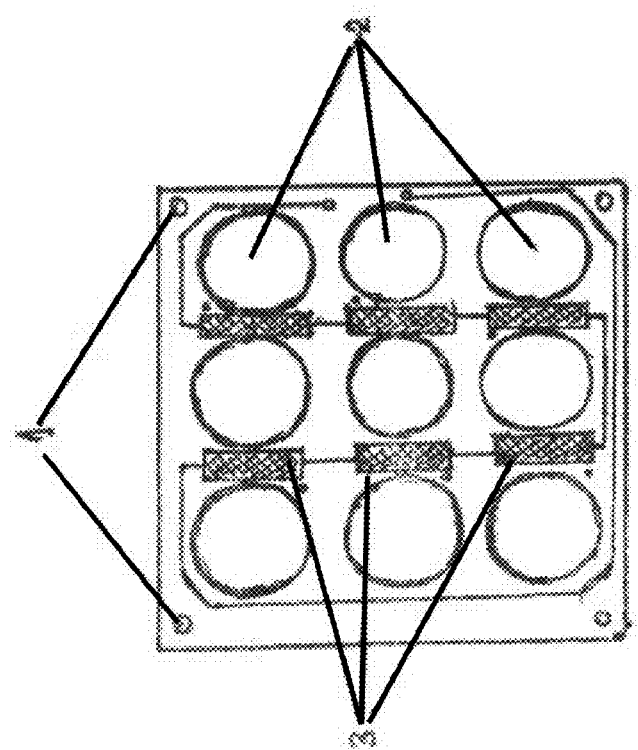
Figure 3:
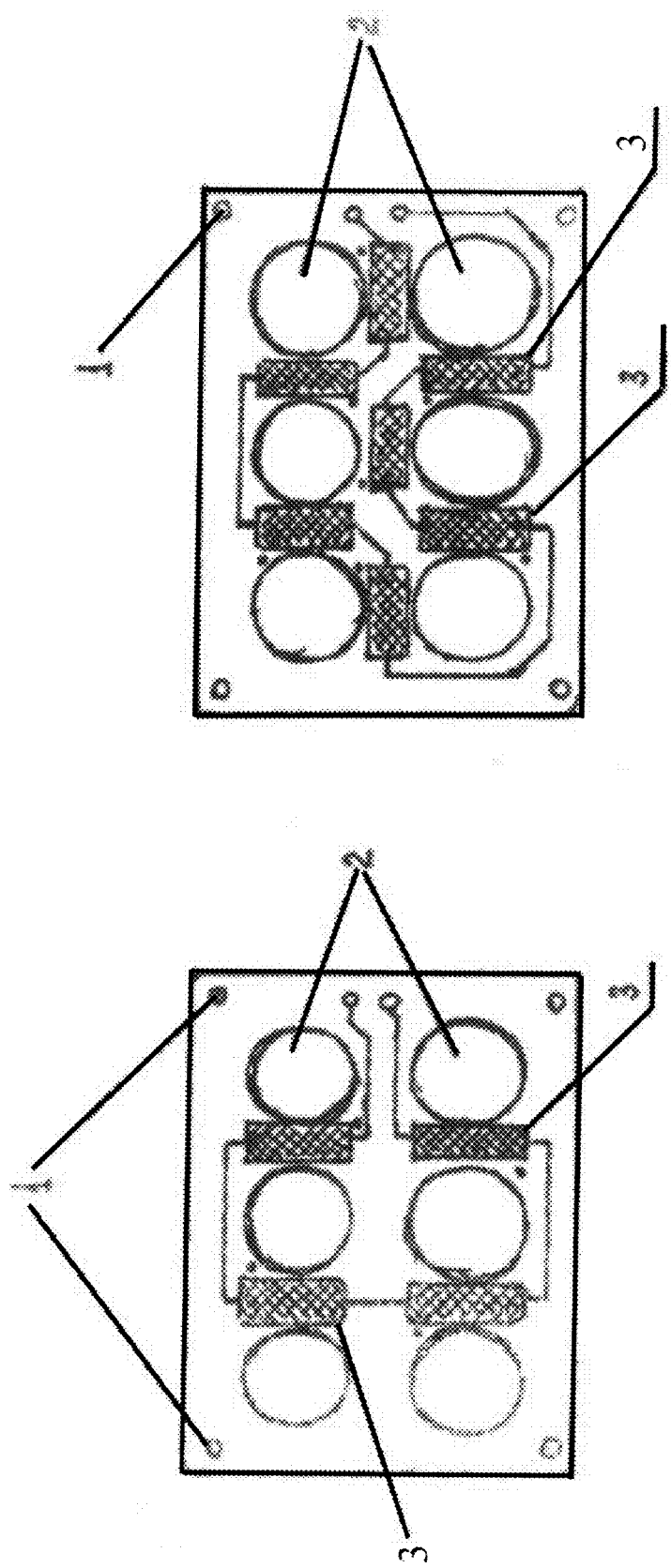

FIGS. 1, 2 and 3 shows location and connections of thermo-sensitive elements, in prior construction and with our innovations.

For a rectangular board (mostly used) the maximum number of thermo-sensitive elements is approximately doubled (see #3 in all figures);

For four openings, 4 instead of 2 thermo sensitive elements may be attached (FIG. 1);

For nine openings, 12 instead of 6 thermo sensitive elements may be attached (FIG. 2);

For six openings, 7 instead of 4 thermo sensitive elements may be attached (FIG. 3) and etc.

For other platform configurations (e.g. round, oval) the number of thermo sensitive elements has also approximately doubled.

It is desirable to use thermo sensitive elements with the exit wires connected from two opposite sides; if the exit wires of the thermo sensitive elements are located on the same side, one needs to use two sided boards with transient holes.

In order to use thermo diodes, one needs to observe the polarity in according to FIGS. 1, 2 and 3 (plus depicted as a point).

Heat flow sensors typically contains two boards, see FIG. 4a: #2 depicts entry openings for air, #3 depicts thermo sensitive elements, #4 and #5 depict plates, on which thermo-sensitive elements are placed.

Boards are fastened at four points with screws, so that the tops of both plates with the thermo sensitive elements face the outer surface of the sensor, so that their openings coincide and the construction provides passage of air through these openings.

The heat flow sensor has three wires—two the positive wires leave from the top and bottom plates, and the common (negative) one leaves from in between the two plates. Therefore the magnitude and direction of the heat flow are determined by the difference between the outputs of the two earlier described plates.

FIG. 4b shows the construction of the heat flow sensor, where an additional plate #6 is placed between the earlier described plates #4 and #5. The additional plate #6 has openings coinciding with those of plates #4 and #5, but doesn't possess thermo elements. This may be used to increase the sensitivity of the sensor.

FIG. 4c shows construction of the heat flow sensor; here a single two sided board may be used.

The boards of the heat flow sensor might be made from a flexible material.

The diameter of the openings and distance between them are determined by the dimensions of the thermo elements.

The outsides of the heat flow sensor are protected by a special screen or film covers.

What is claimed is:

1. A heat flow sensor comprising:
at least two plates, each plate having a plurality of thermo-sensitive elements disposed on one surface thereof and having a plurality of holes for the passage of air flow, where the surfaces of the plates on which the thermo-sensitive elements are disposed face away from each other, where their holes are aligned to allow passage of air through the holes, where each of the thermo-sensitive elements is located between a different pair of the holes, where the thermo-sensitive elements on each of the plates are serially interconnected, where the thermo-sensitive elements on one of the plates are connected to the thermo-sensitive elements on another of the plates at a point of connection, and where a magnitude and a direction of heat flow are determined by the difference between the outputs of the thermo-sensitive elements on the plates.

2. The flow sensor of claim 1, wherein intermediate said plates is an additional thermo-sensitive-elementless plate having a plurality of holes, where corresponding holes of each of the plates are aligned.

3. The flow sensor of claim 1, wherein at least one of said plates is made of a flexible material.

4. The flow sensor of claim 1, wherein the diameter of the holes and the distance between the holes are determined by the dimensions of the thermo-sensitive elements.

5. The flow sensor of claim 1, wherein said plates are fastened to each other at corners thereof.

6. The flow sensor of claim 1, wherein said plates are protected by either of a screen or a film cover.

* * * * *